May 14, 1929.  C. J. W. CLASEN  1,712,749

RAILWAY CAR TRUCK

Filed Feb. 25, 1928

INVENTOR
C. J. W. Clasen
BY Evans & McCoy
ATTORNEYS

Patented May 14, 1929.

1,712,749

UNITED STATES PATENT OFFICE.

CLAUS J. WERNER CLASEN, OF DAVENPORT, IOWA, ASSIGNOR TO THE BETTENDORF COMPANY, OF BETTENDORF, IOWA, A CORPORATION OF IOWA.

RAILWAY-CAR TRUCK.

Application filed February 25, 1928. Serial No. 256,945.

This invention relates to railway car truck and has for its object to provide a truck of simple, rugged and relatively inexpensive construction in which rail friction and tread wear are greatly reduced by mounting the supporting wheels for independent rotation.

A further object of the invention is to utilize the truck axles not only for mounting the supporting wheels, but also as frame members providing rigid cross connections between the longitudinal frame members at opposite sides of the truck.

A further object is to provide a truck in which each wheel is rotatably mounted on its axle and securely held against lateral movement thereon.

A further object is to provide a construction which may be easily assembled and in which all parts are readily removable for replacement or repair.

A further object is to provide a construction which makes unnecessary the provision of a spring plank across the central portion of the frame.

A further object is to provide a truck of the character above described in which the brakes are mounted between the front and rear wheels.

With the above and other objects in view, the invention may be said to comprise a truck as illustrated in the accompanying drawings hereinafter described and particularly set forth in the appended claims, together with such variations and modifications thereof as will be apparent to one skilled in the art to which the invention appertains.

Reference should be had to the accompanying drawing forming a part of this specification in which.

Figure 1:
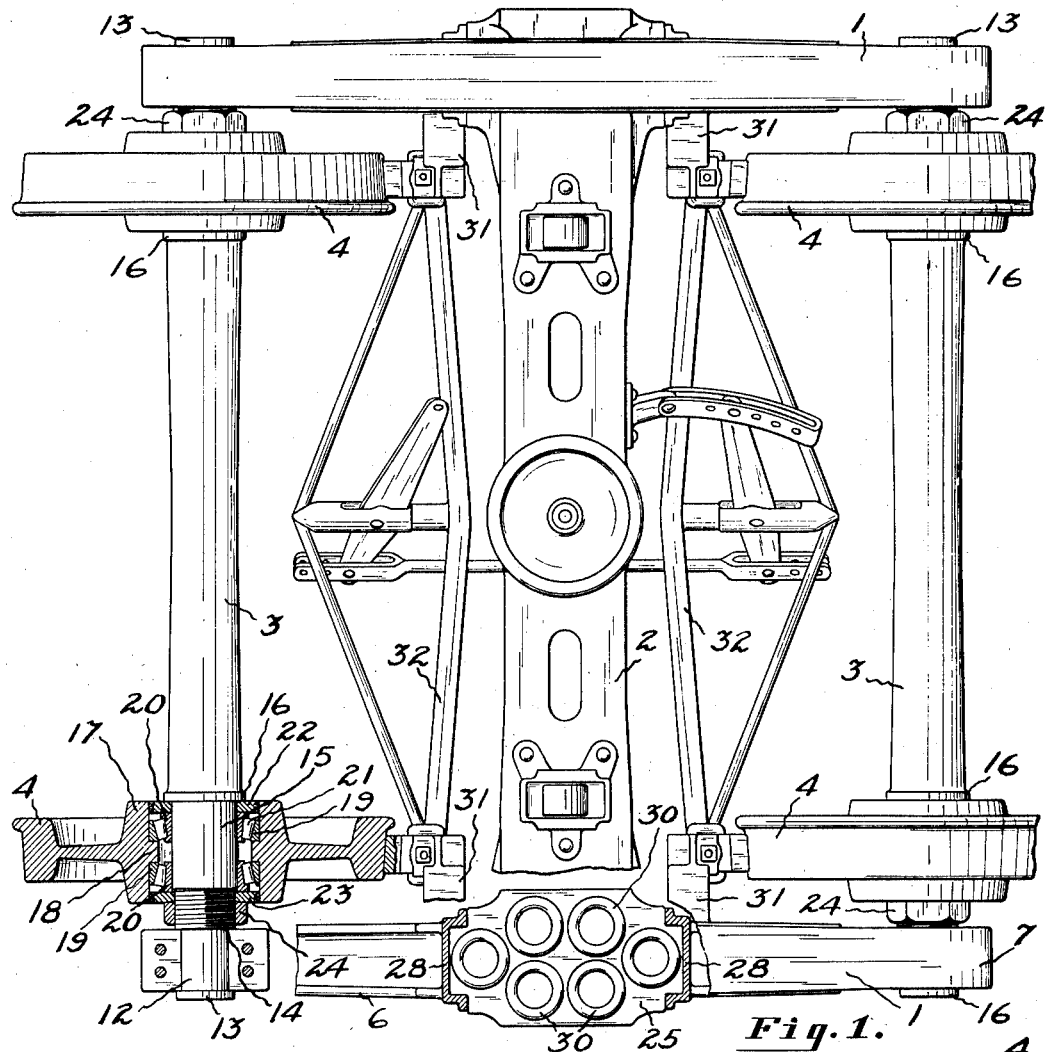
Figure 1 is a plan view of a truck embodying the invention, with a portion broken away at one side and shown in section.
Figure 2:
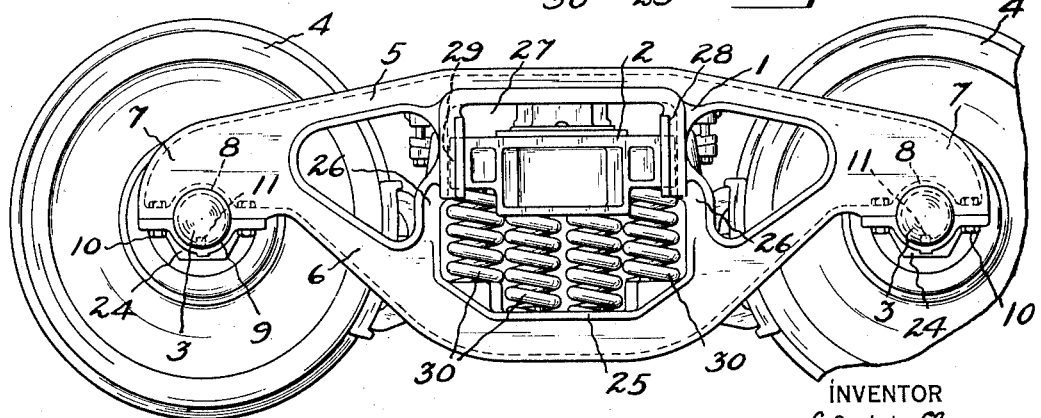
Fig. 2 is a side elevation of the truck as shown in the accompanying drawing.

The truck is provided with a longitudinal frame member 1 at each side thereof, the two frame members providing supports for the opposite ends of a centrally disposed bolster 2. The opposite ends of the frame members 1 are connected by transverse axles 3 which have supporting wheels 4 rotatably mounted thereon adjacent their ends.

Each of the longitudinal frame members is of truss form having a compression chord 5 and a tension chord 6 merging into end portions 7 which overlie the axles 3. Each end portion 7 is provided on the under side thereof with a half bearing 8 which fits over the axle and, detachably secured to the under sides of the end portions 7, are complemental half bearings 9 which are fastened to the frame members by bolts 10. The axles 3 are held against rotation in the frame members by means of suitable keys 11 carried by the axle and fitting in grooves in the half bearings 9.

The end portions 12 of the axles secured in the bearings of the frame are of reduced diameter providing shoulders 13 engaging the outer sides of the frame members and at the inner sides of the side frame members, shoulders are provided at the outer ends of threaded portions 14 of a diameter greater than the portions 12 so that the axles are rigidly held against endwise movements in the side frame members. Inwardly of the threaded portions 14, the axles are provided with bearing receiving portions 15 which extend to an annular rib or shoulder 16. Each wheel is provided with a hub 17 which has a central inwardly projecting rib 18 and which has, secured therein on opposite sides of the rib, tapering race rings 19.

Mounted on the bearing receiving portion 15 of the axle are tapering race rings 20 and interposed between the rings 19 and 20 are conical rollers 21, the race rings being oppositely tapered on the sides of the rib 18 to take end thrusts. Fitting against the inner shoulder 16, there is an oil retaining ring 22 which has a close running fit within the hub 17, the ring 22 being held against the shoulder 16 by the inner of the race rings 20. An outer oil retaining ring 23 engages the outer of the race rings 20 and is held in place by a nut 24 on the threaded portion 14 which serves to clamp the bearing in place and coacts with the shoulders 16 to hold the bearing in fixed position on the axle.

The tension chord 6 of each of the side frame members is inclined downwardly from the end portions 7 to a central horizontal supporting portion 25 which is joined to the compression chord 5 at its opposite ends by integral vertical columns 26 which are spaced apart sufficiently to provide a bolster opening 27 between them. The upper portions of the columns 26 are offset inwardly and channeled to provide bolster guides 28 and the bolster 2 is provided with laterally projecting ribs 29 at the ends thereof which fit in the channel guides 28. The bolster is supported at each end by a suitable number of coil springs 30 which are interposed between the under side of the bolster and the supporting portion 25 of the tension chord. Each of the frame members is provided on opposite sides of the bolster opening with laterally extending brackets 31 from which brake beams 32 of standard form are suspended.

It will be apparent that the present invention provides a truck which may be manufactured at low cost by reason of its simplicity of design and relatively light weight and that the truck of the present invention reduces maintenance costs by reason of the face that tread wear and rail friction are minimized and by reason of the fact that all parts are readily removable for replacement or repair.

It is also obvious that the keys 11 may be mounted in the keyways with a slight clearance to permit a partial rotation of the axles to allow one corner of the truck to negotiate uneven joints in the track without creating excessive torsional stresses in the axle. It is to be noted, however, that such keys will limit rotation of the axles and the axles provide rigid cross connections between the frame members.

Furthermore, it is to be understood that the particular form of apparatus shown and described, and the particular procedure set forth, are presented for purposes of explanation and illustration and that various modifications of said apparatus and precedure can be made without departing from my invention as defined in the appended claims.

What I claim is:

1. A railway car truck having longitudinal frame members, front and rear axles rigidly secured at their ends to the ends of said longitudinal frame members, supporting wheels independently rotatable on said axles, and roller bearings interposed between said wheels and axles.

2. A railway car truck having longitudinal frame members, front and rear axles rigidly secured at their ends to the ends of said longitudinal frame members, supporting wheels independently rotatable on said axles, roller bearings interposed between said wheels and axles, and means for securing said bearings against movement longitudinally of the axles.

3. A railway car truck having longitudinal frame members, front and rear axles rigidly secured at their ends to the ends of said longitudinal frame members, supporting wheels independently rotatable on said axles, a bolster yieldably supported on the frame members midway between the front and rear axles and brake beam supports carried by the frame members between the front and rear wheels.

4. A railway car truck having front and rear axles provided with end portions of reduced diameter, threaded portions adjacent said reduced portions, bearing receiving portions inwardly of said threaded portions and shoulders at the inner ends of said bearing receiving portions, bearings mounted on said bearing receiving portions, wheels mounted on said bearings, nuts on said threaded portions for clamping said bearings, and side frame members rigidly secured to said reduced end portions of the axles.

5. A railway car truck having front and rear axles provided with end portions of reduced diameter, threaded portions adjacent said reduced portions, roller bearings including race rings on said axle adjacent the threaded portions, wheels mounted on said bearings, nuts on the threaded portions of the axles for clamping said bearings, and side frame members rigidly secured to said reduced end portions of the axles.

6. A railway car truck having longitudinal frame members, transversely extending axles secured at their ends to the longitudinal frame members and rigidly connecting the frame members against movement longitudinally of the axles, wheels mounted on said axles for independent rotation and anti-friction bearings interposed between the wheels and axles.

7. A railway car truck having longitudinal frame members, transversely extending axles secured at their ends to the longitudinal frame members and rigidly connecting the frame members against movement longitudinally of the axles, wheels mounted on said axles for independent rotation, anti-friction bearings interposed between the wheels and axles, and means for securing the bearings in fixed positions on said axles.

8. A railway car truck having longitudinal frame members, transversely extending axles adjacent the front and rear of the truck, each axle being connected at its ends to said frame members and providing a rigid connection between said members against movement longitudinally of the axle, wheels mounted for independent rotation on each axle adjacent the opposite ends thereof, anti-friction bearings interposed between each wheel and axle, a bolster slidably mounted in the frame members centrally thereof and means for yieldably supporting the bolster on said frame members.

In testimony whereof I affix my signature.

CLAUS J. WERNER CLASEN.